(12) United States Patent
Liu et al.

(10) Patent No.: US 8,078,236 B2
(45) Date of Patent: Dec. 13, 2011

(54) ROTARY COVER MECHANISM FOR PORTABLE ELECTRONIC DEVICES

(75) Inventors: Ye Liu, Shenzhen (CN); Hsiao-Hua Tu, Taipei Hsien (TW); Xin-Quan Zhou, Shenzhen (CN); Xu-Ri Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 672 days.

(21) Appl. No.: 12/195,535

(22) Filed: Aug. 21, 2008

(65) Prior Publication Data

US 2009/0312074 A1 Dec. 17, 2009

(30) Foreign Application Priority Data

Jun. 13, 2008 (CN) .......................... 2008 1 0302121

(51) Int. Cl.
*H04M 1/00* (2006.01)

(52) U.S. Cl. ................ 455/575.1; 455/575.4; 455/575.8

(58) Field of Classification Search ............... 455/575.1, 455/575.4, 575.8
See application file for complete search history.

(56) References Cited

U.S. PATENT DOCUMENTS

| 7,866,000 B2 * | 1/2011 | Lee et al. ........................ 16/334 |
| 2005/0137000 A1 * | 6/2005 | Toh et al. ................... 455/575.4 |
| 2009/0029749 A1 * | 1/2009 | Lee ............................. 455/575.4 |
| 2009/0305753 A1 * | 12/2009 | Zhang et al. ............... 455/575.1 |

* cited by examiner

*Primary Examiner* — Barry Taylor
(74) *Attorney, Agent, or Firm* — Altis Law Group, Inc.

(57) ABSTRACT

A rotary mechanism includes a base (10), a cover (30), a torsion spring (40) and a locking module (60). The cover is rotatably mounted to the base. Two ends of the torsion spring are fixed with the base and the cover respectively. The locking module limits the cover rotation relative to the base. When the cover overcomes the limitation of the locking module, the cover is automatically rotated relative to the base by the torsion spring.

18 Claims, 4 Drawing Sheets

ROTARY COVER MECHANISM FOR PORTABLE ELECTRONIC DEVICES

BACKGROUND

1. Field of the Invention

The present invention relates to rotary cover mechanisms and, particularly, to rotary cover mechanisms for portable electronic devices, such as mobile phones and portable computers.

2. Description of Related Art

With the development of wireless communication and information processing technologies, portable mobile terminals, such as mobile phones and personal digital assistants (PDAs), are now in widespread use.

Typical portable electronic devices such as mobile phones mainly include bar mobile phones, foldable mobile phones, slidable mobile phones, and rotatable mobile phones. Rotatable mobile phones have a newer structure which allows the mobile phone to be compact with a modern, novel design.

A traditional rotating mechanism for a mobile phone includes a cover having a display and a body having a keypad. When a user holds this type of mobile phone with one hand, the cover is rotated 180 degrees relative to the body to expose the keypad. When the mobile phone is closed, the cover covers the body, and the keypad is hidden. However, when opening or closing the phone, the mobile phone needs a continued external force to rotate the cover relative to the body. This can make one-handed operation very difficult.

Therefore, there is a room for improvement within the art.

BRIEF DESCRIPTION OF THE DRAWINGS

Many aspects of the present rotating mechanism can be better understood with reference to the following drawings. The components in the drawings are not necessarily drawn to scale, the emphasis instead being placed upon clearly illustrating the principles of the present rotating mechanism. Moreover, in the drawings, like reference numerals designate corresponding parts throughout the several views, in which.

DETAILED DESCRIPTION OF THE EMBODIMENTS

Figure 1:
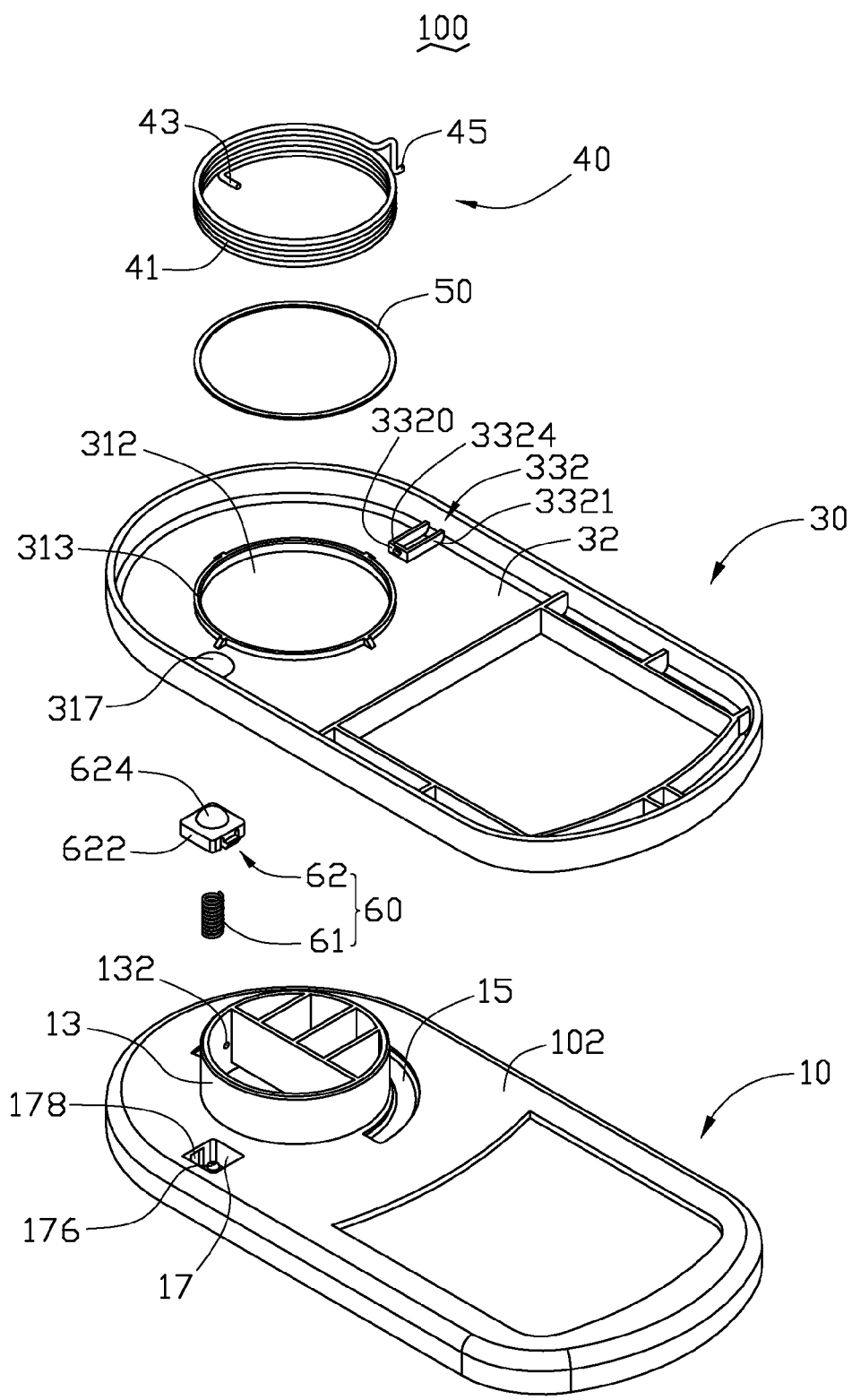
FIG. 1 is an exploded, isometric view of an exemplary rotating mechanism.
Figure 2:
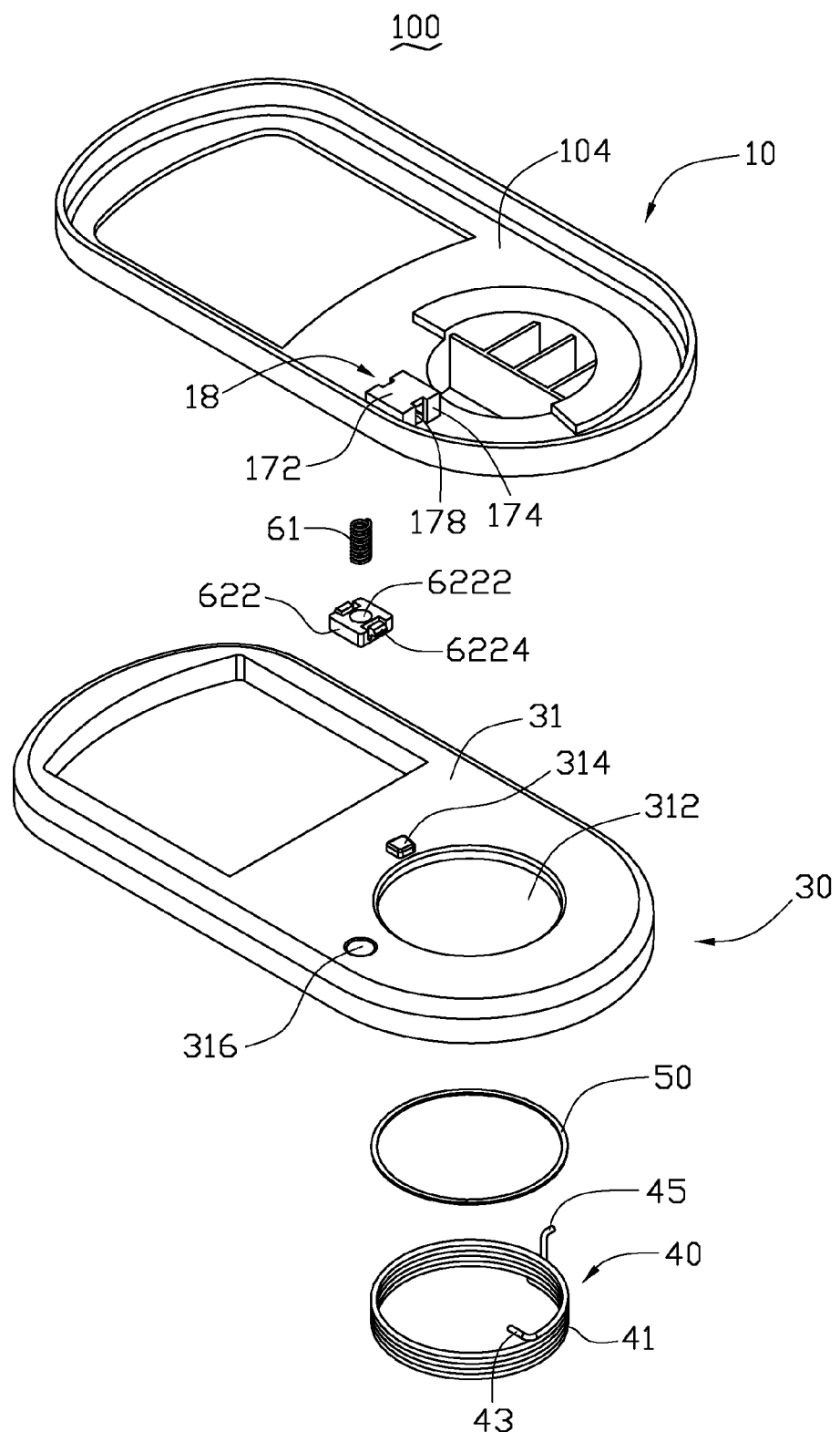
FIG. 2 is similar to FIG. 1, but viewed from another angle.

FIGS. 1 and 2 show an exemplary rotating mechanism 100 including a base 10, a rotary cover 30, a torsion spring 40, a cushion 50 and a locking module 60.

The base 10 includes an upper surface 102 and an opposite lower surface 104. A cylindrical sleeve 13 is formed at one end of the upper surface 102. The sleeve 13 defines a pin hole 132 in an outer circumferential wall thereof. Adjacent to one side of the sleeve 13, the upper surface 102 defines an arcuate sliding groove 15. The sliding groove 15 covers 180 degrees. Adjacent the other side of the sleeve 13, the upper surface 102 defines a recess 17. A protrusion 18 is formed on the lower surface 104 in a position corresponding to the recess 17. The protrusion 18 includes a bottom wall 172 and four sidewalls 174. The bottom wall 172 extends a positioning post 176 toward the upper surface 102 in the recess 17. Two opposite sidewalls 174 respectively define an opening 178 communication with the recess 17.

The rotary cover 30 has a first surface 31 and an opposite second surface 32. One end of the first surface 31 defines a receiving hole 312 for rotatably receiving the sleeve 13. A cylindrical flange 313 is formed on the second surface 32 in a position corresponding to the receiving hole 312. Adjacent to the receiving hole 312, a block 314 is formed on the first surface 31. The block 314 is configured for slidably engaging the sliding groove 15. The first surface 31 defines a circular concave depression 316. Correspondingly, a projection 317 is formed on the second surface 32. The second surface 32 positions a fixing portion 332 opposite to the projection 317. The fixing portion 332 is a substantially U-shaped frame, and includes a top board 3320 and two side boards 3321. The top board 3320 defines a pivot hole 3324.

The torsion spring 40 has a coiled portion 41. An inner diameter of the coiled portion 41 is substantially equal to an outer diameter of the sleeve 13, thereby allowing the coiled portion 41 to be placed around the sleeve 13. The coiled portion 41 has a first end portion 43 and a second end portion 45. The first end portion 43 is bent in a radial direction. The second end portion 45 is bent in an axial direction, and is further perpendicularly bent. The first end portion 43 is used for being locked in the pin hole 132, and the second end portion 45 is used for being engaged in the pivot hole 3324.

A diameter of the cushion 50 is substantially equal to an outer diameter of the sleeve 13. The cushion 50 is made of plastic or rubber, and positions between the torsion spring 40 and the flange 313 of the rotary cover 30, for reducing friction therebetween.

The locking module 60 includes a spring 61 and a locking member 62. An inner diameter of the spring 61 is larger than that of the positioning post 176 so that the spring 61 may be placed around the positioning post 176. The locking member 62 has a seat 622. A top surface of the seat 622 forms a bulge 624, and a bottom surface of the seat 622 defines a containing groove 6222. Two sides of the seat 622 respectively form a clasp 6224 configured for engaging in a corresponding opening 178.

Figure 3:
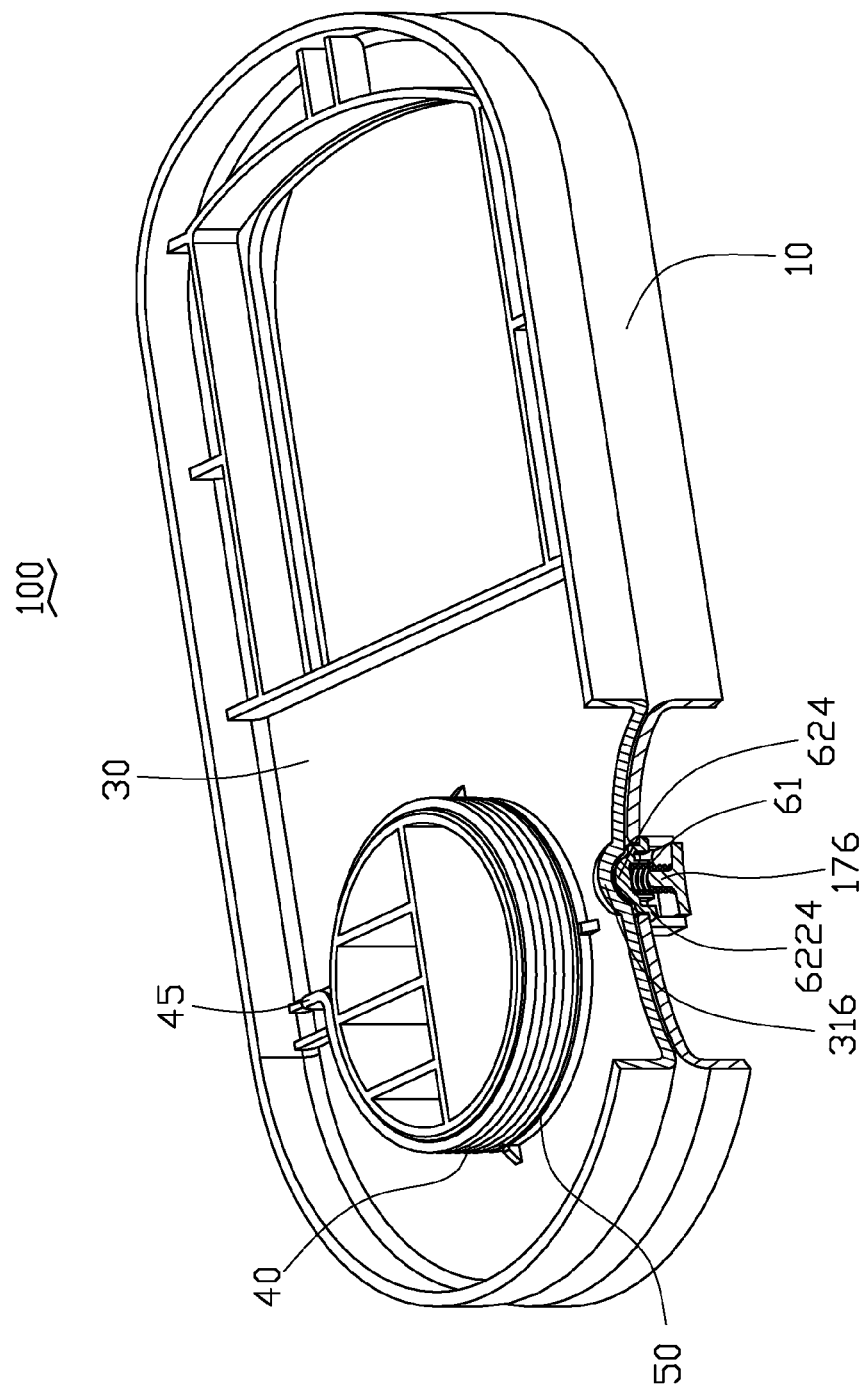
FIG. 3 is an assembled, partially cut-away view of the exemplary rotating mechanism showing a closed state.

Referring to FIG. 3, when assembling the rotating mechanism 100, firstly, the spring 61 is placed around the positioning post 176 in the recess 17. Then, the locking member 62 positions above the spring 61, and one end of the spring 61 is received in the containing groove 6222. The clasps 6224 are respectively locking in a corresponding opening 178. After that, the receiving hole 312 of the cover 30 is placed around the sleeve 13 of the base 10. At the same time, the block 314 of the cover 30 is received in the sliding groove 15, and the bulge 624 of the locking member 62 is pressed in the containing groove 6222 by the spring 61. The cushion 50 is positioned on the flange 313. The torsion spring 40 is placed around the sleeve 13, and positions on the cushion 50. The first end portion 43 is inserted into the pin hole 132, and the second end portion 45 is inserted into the pivot hole 3324. At an initial state, the torsion spring 40 has a predetermined torisional force so the cover 30 is biased towards opening. However, the bulge 624 is limited in the containing groove 316 so the cover 30 is held in a closed position relative to the base 10.

Figure 4:
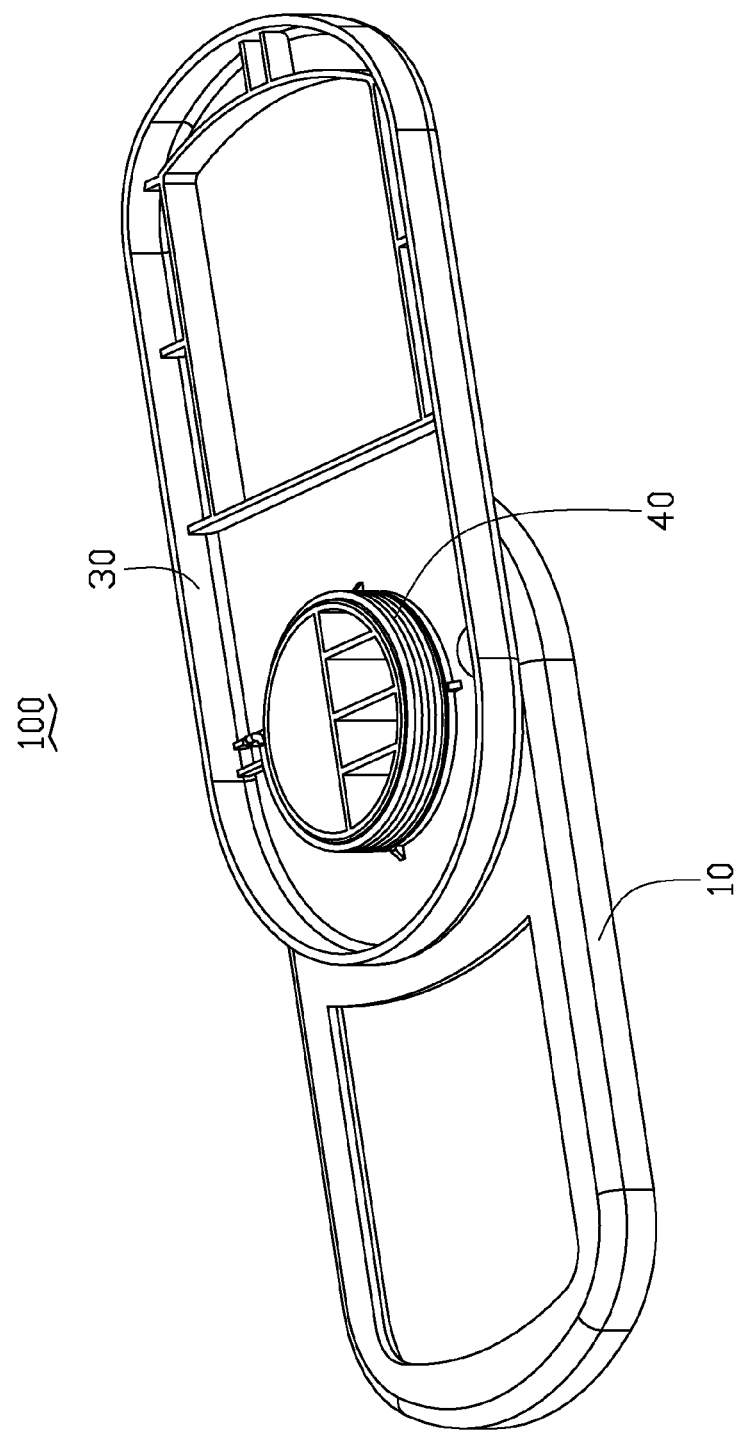
FIG. 4 is an open state view of the exemplary rotating mechanism of FIG. 3.

Referring to FIG. 4, to open the rotating mechanism 100, the rotary cover 30 is manually rotated along the sliding groove 15 so that the bulge 624 overcomes the containing groove 316. Accordingly, the rotary cover 30 automatically rotates due to the torsion spring 40. The block 314 slides along the sliding groove 15 until the block 314 reaches the end of the sliding groove 15. At that time, the rotary cover 30 is automatically opened 180 degrees.

To close the rotary mechanism 100, the rotary cover 30 is reversely rotated until the bulge 624 of the locking member 62 is received in the containing groove 316. When the rotary cover 30 is rotated until the rotary cove 30 is closed relative to the base 10, the torsion spring 30 accumulates torisonal energy for the next opening process.

The spring 61 may alternatively have a different configuration, for example, a leaf spring or a resilient cylinder. The positioning post 176 may be omitted, and the spring 61 may be received in the recess 17.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A rotary mechanism, comprising:
   a base defining a recess and a positioning post formed in the recess, an imaginary central line of the recess being colinear with an longitudinal axis of the post;
   a cover rotatably mounted to the base;
   a torsion spring, two ends of the torsion spring fixed to the base and cover respectively;
   a locking module including a spring and a locking member, the spring having a longitudinal axis co-linear with the imaginary central line of the recess and the longitudinal axis of the positioning post and received in the recess and placed around the positioning post, the locking member positioned on the spring and abutting against the cover, the locking member limiting the cover rotation relative to the base; wherein when the cover overcomes the limitation of the locking module, the cover automatically rotates relative to the base due to the torsion spring.

2. The rotary mechanism as claimed in claim 1, wherein the cover defines a concave depression, one end of the locking member resists the spring, and the other end of the locking member is received in the concave depression.

3. The rotary mechanism as claimed in claim 2, wherein the locking member has a seat, a bulge is formed on a top surface of the seat, and a containing groove is defined in a bottom surface of the seat, one end of the spring is received in the containing groove, and the bulge is received in the concave depression.

4. The rotary mechanism as claimed in claim 3, wherein a clasp is respectively formed at two sides of the seat, a protrusion is formed on the base corresponding to the recess, the protrusion includes a bottom wall and four sidewalls, two opposite sidewalls of the protrusion respectively define an opening communicating with the recess, and each clasp is through the recess, and is engaged in a corresponding opening.

5. The rotary mechanism as claimed in claim 1, wherein the cover defines a receiving hole, and the base forms a sleeve, the sleeve is rotatably received in the receiving hole.

6. The rotary mechanism as claimed in claim 5, wherein the sleeve defines a pin hole, the cover forms a fixing portion, one end of the torsion spring is locking in the pin hole, and another end of the torsion spring is locking in the fixing portion.

7. The rotary mechanism as claimed in claim 6, wherein the fixing portion includes a bottom board and two side boards, the bottom board defines a pivot hole.

8. The rotary mechanism as claimed in claim 1, wherein the torsion spring has a first end portion and a second end portion, the first end portion is bent in a radial direction, and the second end portion is bent in an axial direction and further bent in a radial direction.

9. The rotary mechanism as claimed in claim 1, wherein the base defines a sliding groove, the cover forms a block, the block slidably received in the sliding groove.

10. The rotary mechanism as claimed in claim 1, further comprising a cushion positioned between the cover and the torsion spring.

11. A portable electronic device, comprising:
    a base defining a recess and a positioning post formed in the recess;
    a cover rotatably mounted to the base;
    a torsion spring, two ends of the torsion spring fixed to the base and the cover, respectively;
    a locking module including a spring and a locking member, the spring received in the recess and placed around the positioning post, the locking member positioned on the spring and abutting against the cover, the locking member limiting the cover rotation relative to the base; wherein when the cover overcomes the limitation of the locking module, the cover is automatically rotated relative to the base due to the torsion spring.

12. The portable electronic device as claimed in claim 11, wherein the torsion spring has a first end portion and a second end portion, the first end portion is bent in a radial direction, and the second end portion is bent in an axial direction and further bent in a radial direction.

13. The portable electronic device as claimed in claim 11, wherein the base defines a sliding groove, the cover forms a block, the block is slidably received in the sliding groove.

14. The portable electronic device as claimed in claim 11, further comprising a cushion, wherein the cushion positions between the cover and the torsion spring.

15. The portable electronic device as claimed in claim 11, wherein the cover defines a concave depression, one end of the locking member resists the spring, and the other end of the locking member is received in the concave depression.

16. The portable electronic device as claimed in claim 15, wherein the locking member has a seat, a bulge is formed on a top surface of the seat, and a containing groove is defined in a bottom surface of the seat, one end of the spring is received in the containing groove, and the bulge is received in the concave depression.

17. The portable electronic device as claimed in claim 16, wherein a clasp is respectively formed at two sides of the seat, a protrusion is formed on the base corresponding to the recess, the protrusion includes a bottom wall and four sidewalls, two opposite sidewalls of the protrusion respectively define an opening communicating with the recess, and each clasp is through the recess, and is engaged in a corresponding opening.

18. The portable electronic device as claimed in claim 11, wherein an imaginary central line of the recess is colinear with an longitudinal axis of the post, and the spring has a longitudinal axis co-linear with the imaginary central line of the recess and the longitudinal axis of the positioning post.

* * * * *